United States Patent
Zhang et al.

(10) Patent No.: US 7,801,220 B2
(45) Date of Patent: Sep. 21, 2010

(54) IN-BAND WAVELET VIDEO CODING WITH SPATIAL SCALABILITY

(75) Inventors: Dongdong Zhang, Shanghai (CN); Feng Wu, Beijing (CN); Jizheng Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 11/203,817

(22) Filed: Aug. 15, 2005

(65) Prior Publication Data

US 2006/0153465 A1 Jul. 13, 2006

Related U.S. Application Data

(60) Provisional application No. 60/642,371, filed on Jan. 7, 2005.

(51) Int. Cl.
H04N 7/12 (2006.01)
(52) U.S. Cl. ............. 375/240.19; 375/240; 375/240.01; 375/240.12
(58) Field of Classification Search ................. 375/240, 375/240.01, 240.11, 240.12, 240.16, 240.19
See application file for complete search history.

(56) References Cited

U.S. PATENT DOCUMENTS

| 7,072,394 | B2 * | 7/2006 | Huang et al. | 375/240.11 |
| 7,142,601 | B2 * | 11/2006 | Kong et al. | 375/240.16 |
| 7,292,635 | B2 * | 11/2007 | Yim et al. | 375/240.16 |

OTHER PUBLICATIONS

Park, et al., "Motion Estimation Using Low-Band-Shift Method for Wavelet-Based Moving-Picture Coding", IEEE Trans. on Image Processing, vol. 9, No. 4, pp. 577-587, Apr. 2000.

* cited by examiner

*Primary Examiner*—Allen Wong
(74) *Attorney, Agent, or Firm*—Lee & Hayes, PLLC

(57) ABSTRACT

Exemplary improvements for in-band wavelet video coding with spatial scalability are described. In one implementation an encoder uses leaky prediction to balance a trade-off between reducing drifting errors at lower resolutions while maintaining coding performance at higher resolutions. In an alternative implementation, a trade-off technique defines two coding modes at the macroblock level. The first mode includes predictions employed at a low quality reference while the second mode includes predictions employed at a high quality reference. The method then adaptively selects the proper coding mode for each macroblock according to a rate-distortion criterion.

17 Claims, 10 Drawing Sheets

IN-BAND WAVELET VIDEO CODING WITH SPATIAL SCALABILITY

RELATED APPLICATIONS

The present application claims priority to U.S. Provisional Patent Application No. 60/642,371 to Feng Wu et al., entitled, "Improvements Of In-Band Wavelet Video Coding With Spatial Scalability," filed Jan. 7, 2005.

BACKGROUND

For processing digital imagery into scalable bitstreams, the discrete wavelet transform (DWT) uses multi-resolution analysis to decompose images into a set of subbands, each of which contains specific image information relevant to a given resolution of the images. For example, a low resolution subband at a particular resolution level may appear as a reduced version of the original image while more detailed subbands may contain more detailed horizontal, vertical, and diagonal information related to local texture and edges at a given resolution. Wavelets can yield a signal representation in which lowpass coefficients represent the most slowly changing data while highpass coefficients represent more fast-moving localized changes. Thus, DWT provides a schema in which short-term changes and long-term trends can be analyzed, compared, and processed on equal footing. Because of the ability of DWT to support spatial scalability, more recent compression standards have begun to adopt DWT as the spatial energy compaction tool instead of the discrete cosine transform (DCT).

Conventionally, many implementations of DWT employ a filter bank consisting of a pair of complementary 1-dimensional (1D) highpass/lowpass filters followed by a subsampling operation. In the conventional case of the 2-dimensional (2D) horizontal and vertical dimensions of a video frame, identical 1D filter banks are applied, first along each image row and then along each image column, producing four subbands (referred to as LL, HL, LH, and HH). In one setup, for an n-level transformation, the 2D filter bank is recursively applied "n" times to the LL subband obtained at each level. The four subbands, LL, HL, LH, and HH, are designated with "L" or "H" according to whether a lowpass filter (L) or a highpass filter (H) is applied horizontally (the first letter) and/or vertically (the second letter).

The lowpass (LL) information is often used as the basis for motion prediction since much of the signal energy is connected to this subband and it is often the first to be sent in progressive transmission schemata in order to make LL available for deriving the other bands at a decoder. The LH and HL subbands contain a majority of the highpass energy. These subbands have frequency responses that overlap with the LL band over a wide range of frequencies. The aliasing caused by decimation in wavelet decomposition makes it impossible to do direct band-to-band motion estimation between highpass subbands in neighboring video frames. Thus, to avoid the aliasing effect caused by decimation, lowpass subbands (e.g., LL) are relied upon for motion estimation in the wavelet domain.

A lifting schema is an alternative way to compute the DWT. Lifting schemata usually replace the lowpass/highpass filter pair by a "ladder" consisting of dual lifting steps that include "prediction" filters using a prediction operator P( ) and lifting steps using an update filter U( ). At the end of the ladder procedure, a scaling step is applied to obtain the lowpass and highpass subbands. This lifting technique using a ladder procedure provides several benefits over conventional filter banks. For example, it may reduce computations and allow more efficient filter management. Lifting-based wavelet transforms may use the 9/7 wavelet base, which provides lossy compression, or the 5/3 wavelet base which can be used as an "integer wavelet transform" for lossless coding.

In-band motion compensated temporal filtering (IBMCTF or just "in-band MCTF") is based on the extension of a conventional MCTF concept into the wavelet domain. In 3-dimensional (3D) wavelet coding, the entire video sequence is decomposed into many temporal-spatial subbands through a number of motion aligned temporal transforms and spatial transforms. These subbands are assumed to be independent and some of them can be dropped when some type of resolution scalability is demanded. For example, to support spatial scalability, the spatial high-pass subbands are usually dropped and the decoder just carries out the decoding process with only the received data that is in spatial lowpass subbands, e.g., the LL subband.

In the in-band MCTF schema, the original video is first spatially decomposed and then the MCTF is carried out in the wavelet domain, possibly with subsequent further spatial decompositions. In-band MCTF allows adaptive processing for each subband, that is, each subband can have a different motion estimation accuracy, different interpolation filters, different temporal filter taps, etc. Thus, in-band MCTF is gaining popularity because it is a general and flexible coding framework that directly supports and offers advantages for spatial scalability as compared with spatial domain MCTF schemata.

Conventionally, for a Common Intermediate Format (CIF) video sequence, if one-level spatial scalability is demanded at the decoder, the encoder only has to include the context information of the spatial LL band in the bitstream being encoded. The context of the LH, HL and HH subbands can be dropped to meet bandwidth characteristics or limitations. However, to reduce the effect of wavelet shift-variance on the efficiency of motion estimation and motion compensation in the wavelet domain, a "low-band shift method" (LBS) was developed to perform the motion estimation and motion compensation more efficiently with an "overcomplete" form of the reference band (Hyun-Wook Park, Hyung-Sun Kim, "Motion Estimation Using Low-Band-Shift Method for Wavelet-Based Moving-Picture Coding", /IEEE Trans. on Image Processing, VOL. 9, No. 4, pp. 577-587, April 2000). This LBS method allows wavelet domain motion estimation and motion compensation using shift-invariant overcomplete wavelets. Overcomplete lowpass (LL) band information is thus distinguishable from "ordinary" spatial lowpass (LL) band information.

As shown in FIG. 1, problems can arise when an LBS reference frame, denoted as IP_LBS 100, is used with in-band MCTF for a bitstream that is to provide a low resolution mode within spatial scalability. Even though MCTF that is based on LBS can remarkably improve coding efficiency in the wavelet domain, some of the spatial high band information that is included in the LBS schema for coding the low band information into the overcomplete LL band 102 used at the encoder 104, cannot be obtained at the decoder 106 when the decoder 106 executes a low spatial resolution display. That is, in some cases only reference frames based on ordinary LL band information 108 may be obtainable at the decoder 106.

For example, assume that the original video sequence is CIF video and one-level spatial scalability is demanded at the decoder 106. In the case of a quarter-pixel mode of motion estimation 110 and motion compensation 112, the interpolation reference frame, IP_LBS 100, is obtained at the encoder 104 by half-pixel interpolation of each band in the corresponding overcomplete sub-band of original video. At the decoder 106, when decoding the lower resolution QCIF (quarter CIF) video sequence, only the ordinary spatial LL band 108 (i.e., the spatial lowpass band, which represents the low resolution's video signals) can be obtained. Instead of half-pixel interpolation as at the encoder 104, direct quarter-pixel interpolation is applied to this spatial LL band 108 at the decoder 106 to generate the reference frame, in this case denoted by IP_DIR 114. Because of the mismatch of interpolation reference frames between encoder 104 and decoder 106, the well-known phenomenon of drifting error will occur when decoding at the lower resolution when IP_LBS 100 is used as the reference for the LL band. However, since IP_LBS 100 contains more information from the original video frames, including low-pass information and high-pass information, IP_LBS 100 is inherently a better overall reference than IP_DIR 114.

In FIG. 2, another technique is adopted in an attempt to resolve the drifting error problem just described. The encoder 104 uses MCTF with only the ordinary spatial lowpass band information 108. This technique, however, brings coding performance loss when the full spatial resolution sequence is decoded. This is because the ordinary spatial lowpass band 108, by itself, does not have all of the high band information 102 that the LL band includes when IP_LBS 100 is used as the reference for the LL band.

SUMMARY

Exemplary improvements for in-band wavelet video coding with spatial scalability are described. In one implementation an encoder uses leaky prediction to balance a trade-off between reducing drifting errors at lower resolutions while maintaining coding performance at higher resolutions. In an alternative implementation, a trade-off technique defines two coding modes at the macroblock level. The first mode includes predictions employed at a low quality reference while the second mode includes predictions employed at a high quality reference. The method then adaptively selects the proper coding mode for each macroblock according to a rate-distortion criterion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Described herein are methods and systems for improving in-band wavelet video coding with spatial scalability. Exemplary techniques presented herein offer an improved balance between reduced drifting error at low spatial resolutions versus improved prediction and coding efficiency at higher spatial resolutions.

In one implementation, an improved "balanced reference frame" provides a video decoder 106 with a balance of both spatial low band information and spatial high band information in a manner that the advantages of each type of information are available at both low and high spatial resolutions. A leaky lifting technique creates a balanced interpolation reference frame, which the decoder can use to implement an advantageous trade-off between minimizing drifting error at lower spatial resolutions and maximizing coding efficiency at higher spatial resolutions.

In another implementation, two coding modes are made available at the macroblock encoding level. At a lower spatial resolution coding mode, drifting error is reduced for the current macroblock, while at a higher spatial resolution coding mode, coding efficiency is favored for the current macroblock. This exemplary adaptive macroblock coding technique directs each macroblock to one of the two coding modes based on rate-distortion information.

Exemplary Engine

In-band motion-compensated temporal filtering (MCTF) schemata are useful because they directly support spatial scalability and offer a flexible coding framework, as compared with spatial domain MCTF schemata.

Figure 3:
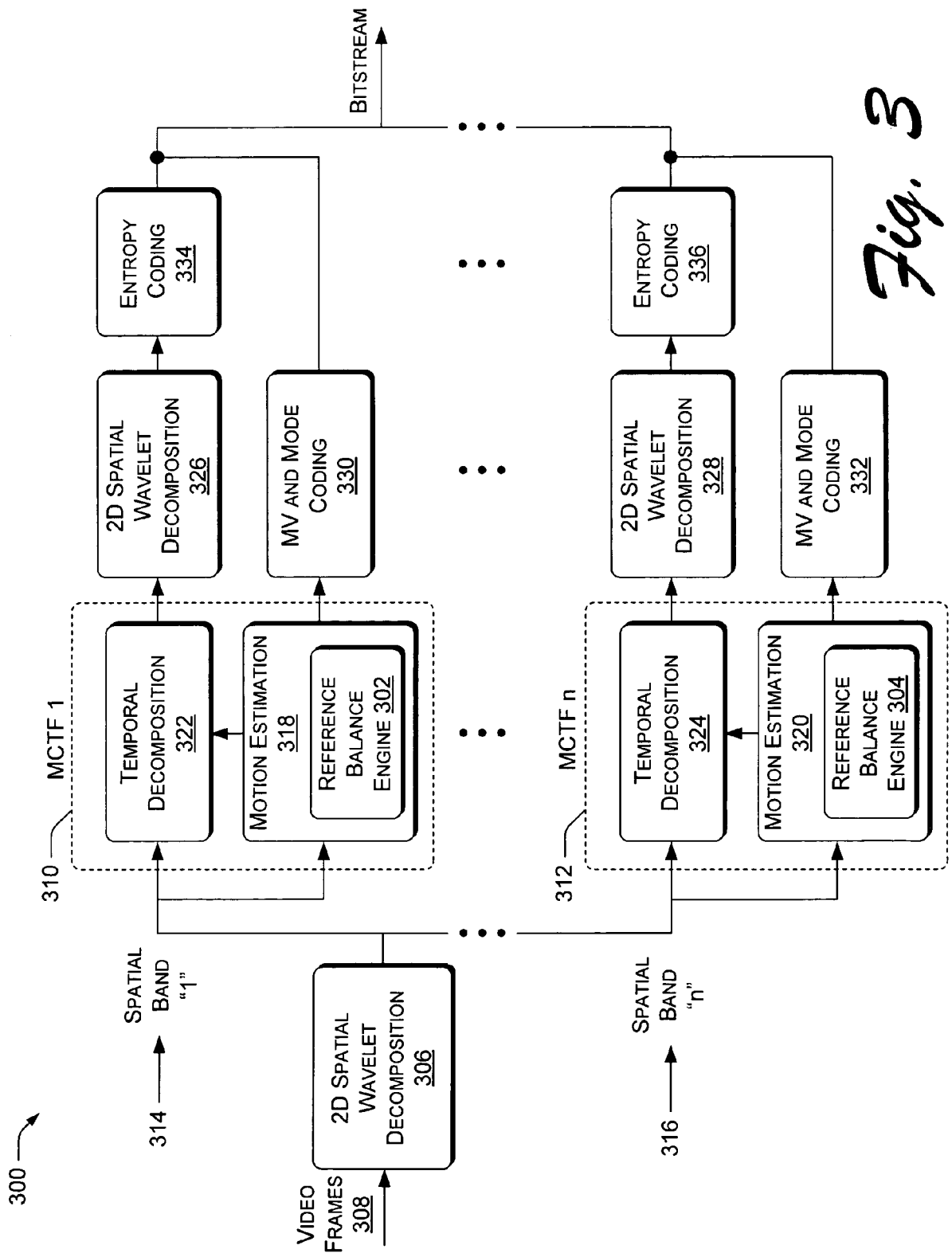
FIG. 3 is a block diagram of an exemplary encoder including an exemplary reference balance engine.

FIG. 3 shows an exemplary in-band MCTF encoder 300, including exemplary reference balance engines 302 and 304. The exemplary encoder 300 is meant to provide one example arrangement for the sake of overview. Many other arrangements of the illustrated components, or similar components, are possible. Such an exemplary encoder 300 can be executed in hardware, software, or combinations of hardware, software, firmware, etc.

Figure 4:
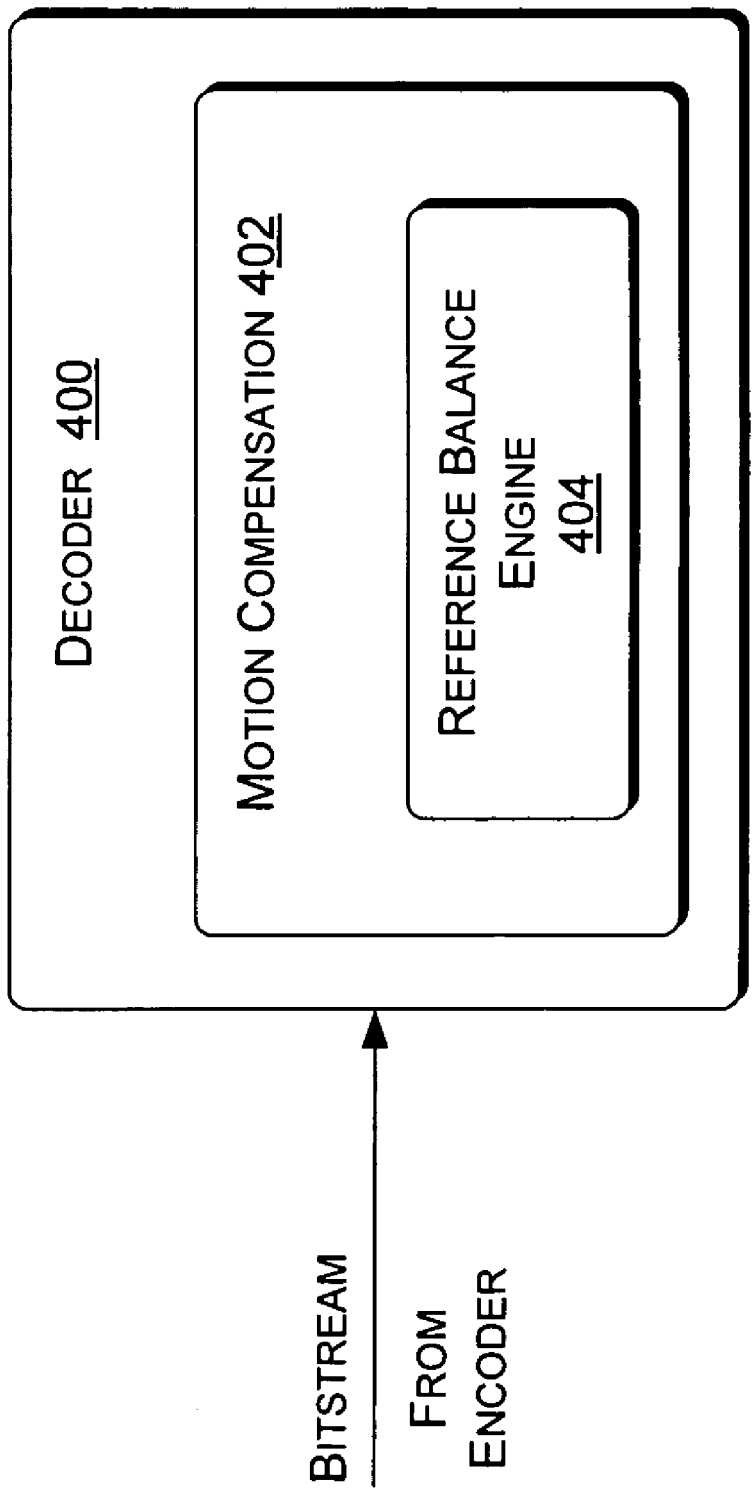
FIG. 4 is a block diagram of an exemplary decoder including an exemplary reference balance engine.

The spatial wavelet transform 306 is first applied on an original video sequence 308. Then MCTF (e.g., 310, 312) is applied to each spatial band (e.g., 314, 316) to explore the temporal correlation. The MCTF for each spatial band includes motion estimation (e.g., 318, 320) and temporal decomposition (e.g., 322, 324). For each temporal band corresponding to a spatial band (e.g., 314, 316) a spatial transform (e.g., 326, 328) can be employed to further remove the spatial correlation. The motion estimation (318, 320) is also used for the motion vector and mode coding (e.g., 330, 332). In the process of entropy coding (e.g., 334, 336) the residual coefficients of each spatial-temporal band are coded independently so that the exemplary encoder 300 can easily adapt the number of spatial-temporal bands to be coded according to network bandwidth or to temporal and spatial scalability needed at decoding. FIG. 4 shows an exemplary decoder 400 that receives the bitstream from the exemplary encoder 300 and uses motion compensation 402 using an exemplary reference balance engine 404.

Lifting with Leaky Prediction to Balance References

In one implementation, the reference balance engine 302 uses leaky prediction, which is an efficient technique for reducing drifting errors. The fundamental concept underlying this technique is that the leaky factor is used to attenuate the prediction based on the unknown information at the decoder 400. Leaky prediction, as used here, uses a leaky factor between 0 and 1 to balance the coding efficiency and error resilience performance.

Figure 1:
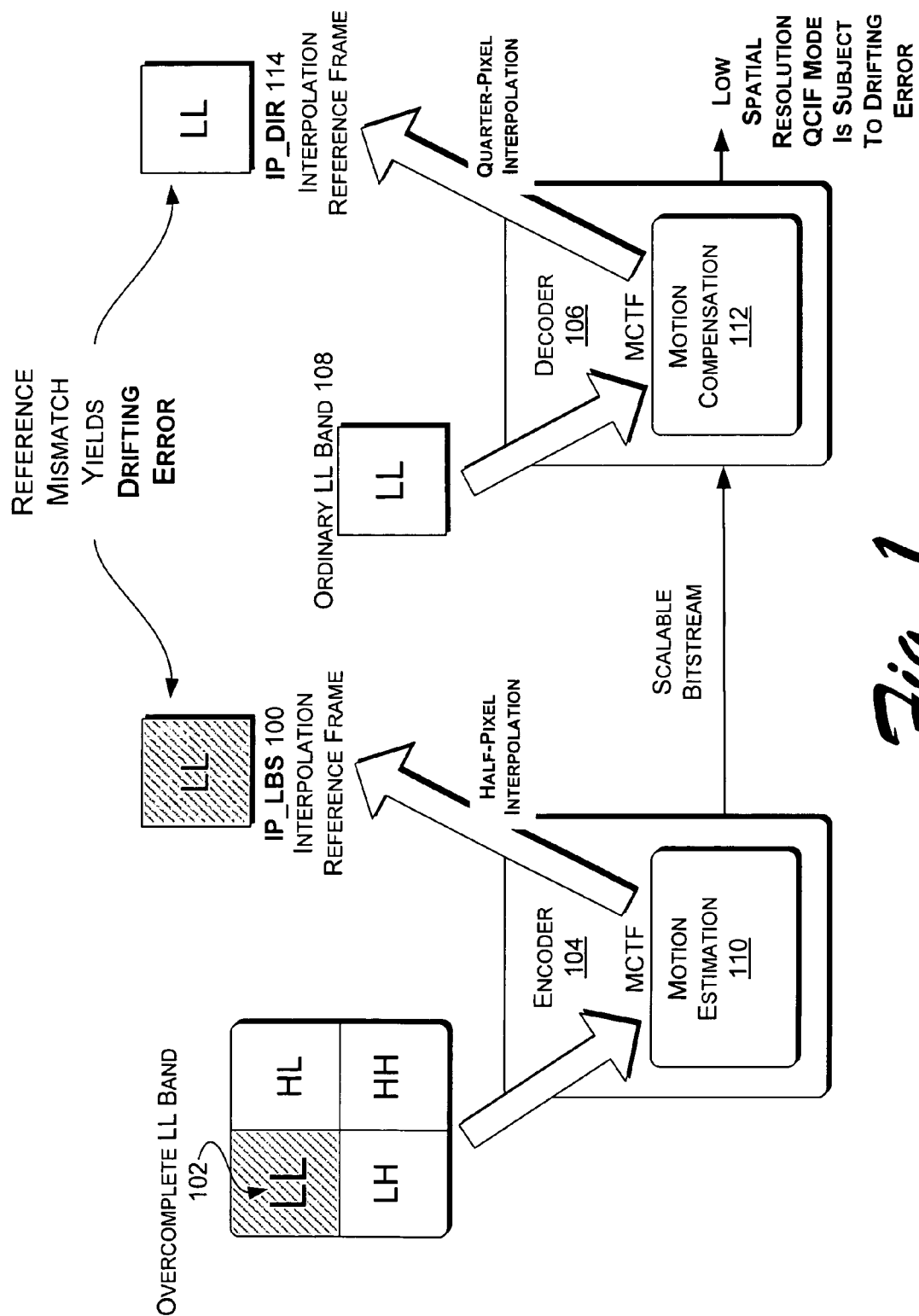
FIG. 1 is a diagram of a conventional in-band wavelet video coding schema that uses overcomplete low band shifted (LBS) references and yields drifting error at lower resolutions.
Figure 2:
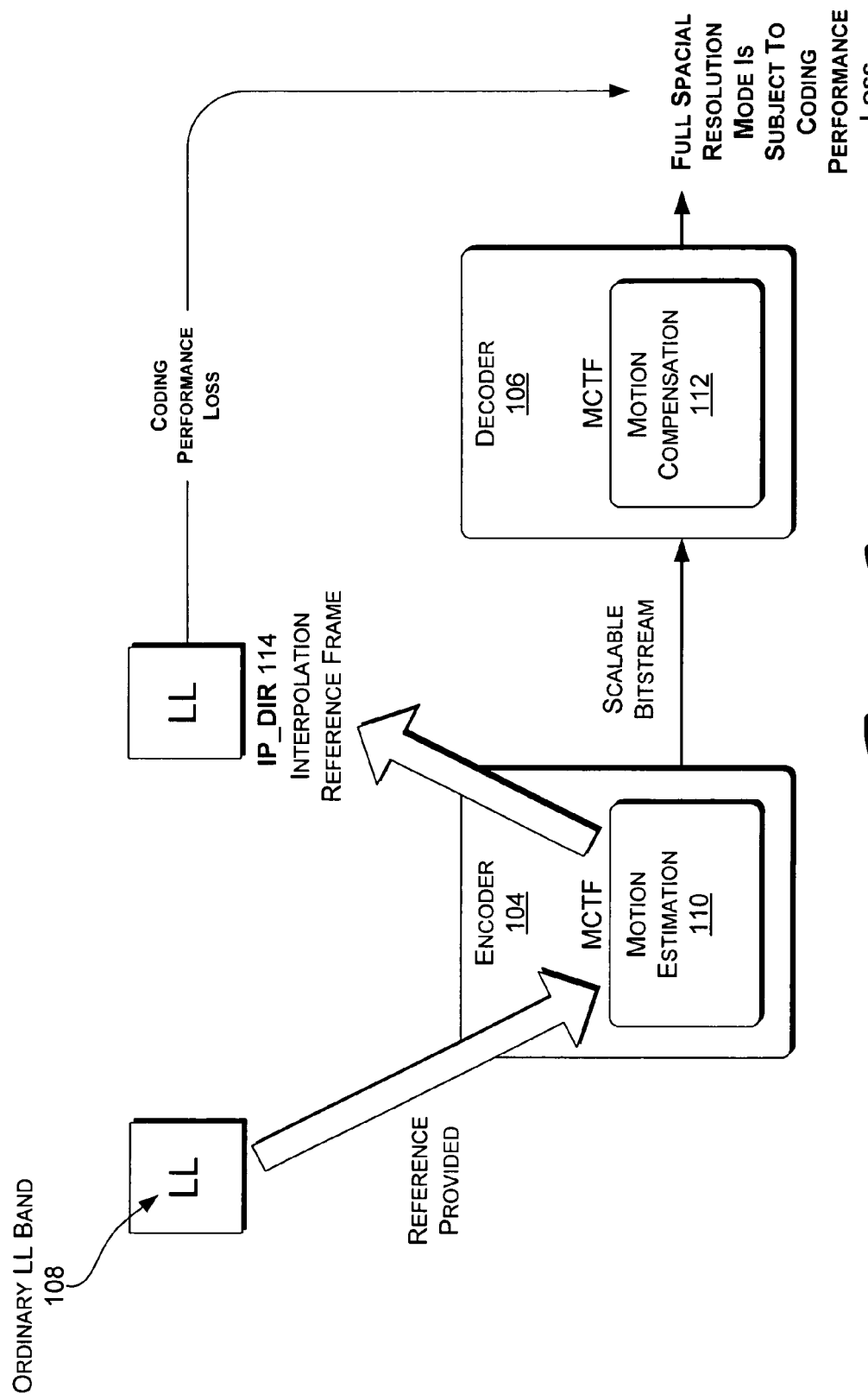
FIG. 2 is a diagram of a conventional in-band wavelet video coding schema that uses spatial lowpass (LL) band information and yields loss of coding performance at higher resolutions.

In most conventional in-band encoding schemata, as described above with respect to FIG. 1, the motion estimation 110 at the encoder 104 is based on IP_LBS 100 reference frames applied at the encoder 104 to improve coding efficiency. However, this brings drifting error when decoding at the lower resolution(s) at the conventional decoder 106.

Figure 5:
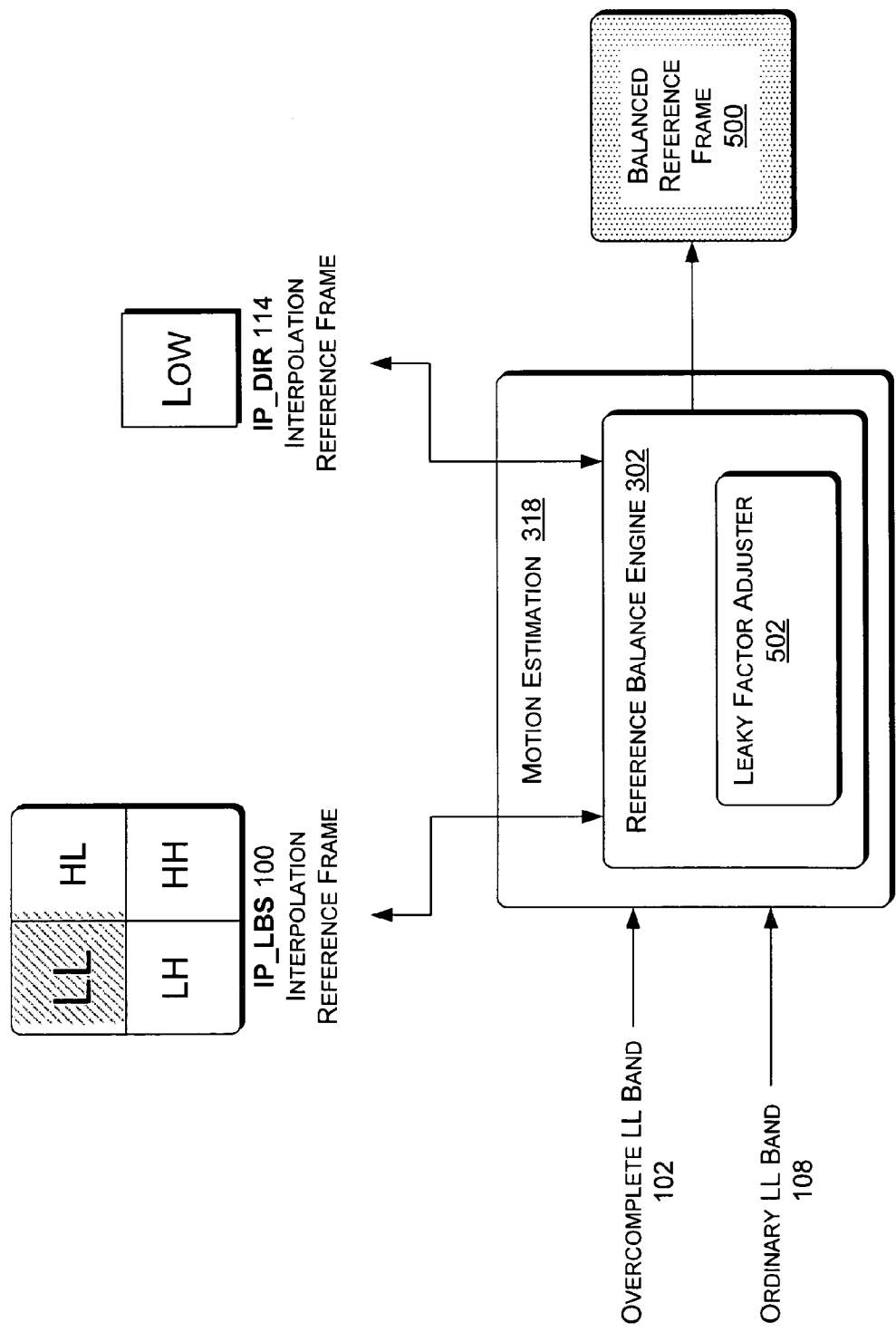
FIG. 5 is a block diagram of an exemplary reference balance engine.

As shown in FIG. 5, in one implementation, exemplary motion estimation 318 has a reference balance engine (e.g., 302) that improves upon simply using the IP_LBS 100 reference frame as in conventional in-band encoding schemata. The exemplary reference balance engine 302 uses lifting with leaky prediction to create balanced interpolation reference frames 500 ("balanced reference frames" or just "balanced references") within the process of motion estimation 318. In a sense, a balanced interpolation reference frame 500 has some of the character of an IP_LBS 100 reference frame and some of the character of an IP_DIR 114 reference frame. When decoding frames, the decoder 400 can use the balanced interpolation reference frame 500 to implement an advantageous trade-off between minimizing drifting error at lower spatial resolutions and maximizing coding efficiency at higher spatial resolutions. The exemplary reference balance engine 302 may include a "leaky factor" adjuster 502 that tunes and adjusts this trade-off between minimizing drifting error at lower spatial resolutions and maximizing coding efficiency at higher spatial resolutions when creating balanced interpolation reference frames 500.

In one implementation, the reference balance engine 302 reduces drifting error for decoding at the lower resolution and maintains a better coding efficiency for full resolution by executing the following process. First, the reference balance engine 302 uses a leaky factor to attenuate the difference between a given IP_LBS 100 reference frame and a corresponding IP_DIR 114 reference frame of the LL band to create an attenuated interpolation reference frame. The reference balance engine 302 then sums together the attenuated interpolation reference frame and the IP_DIR 114 reference frame to create an improved reference frame of the LL band, that is, the reference balance engine 302 creates a balanced interpolation reference frame 500.

Figure 6:
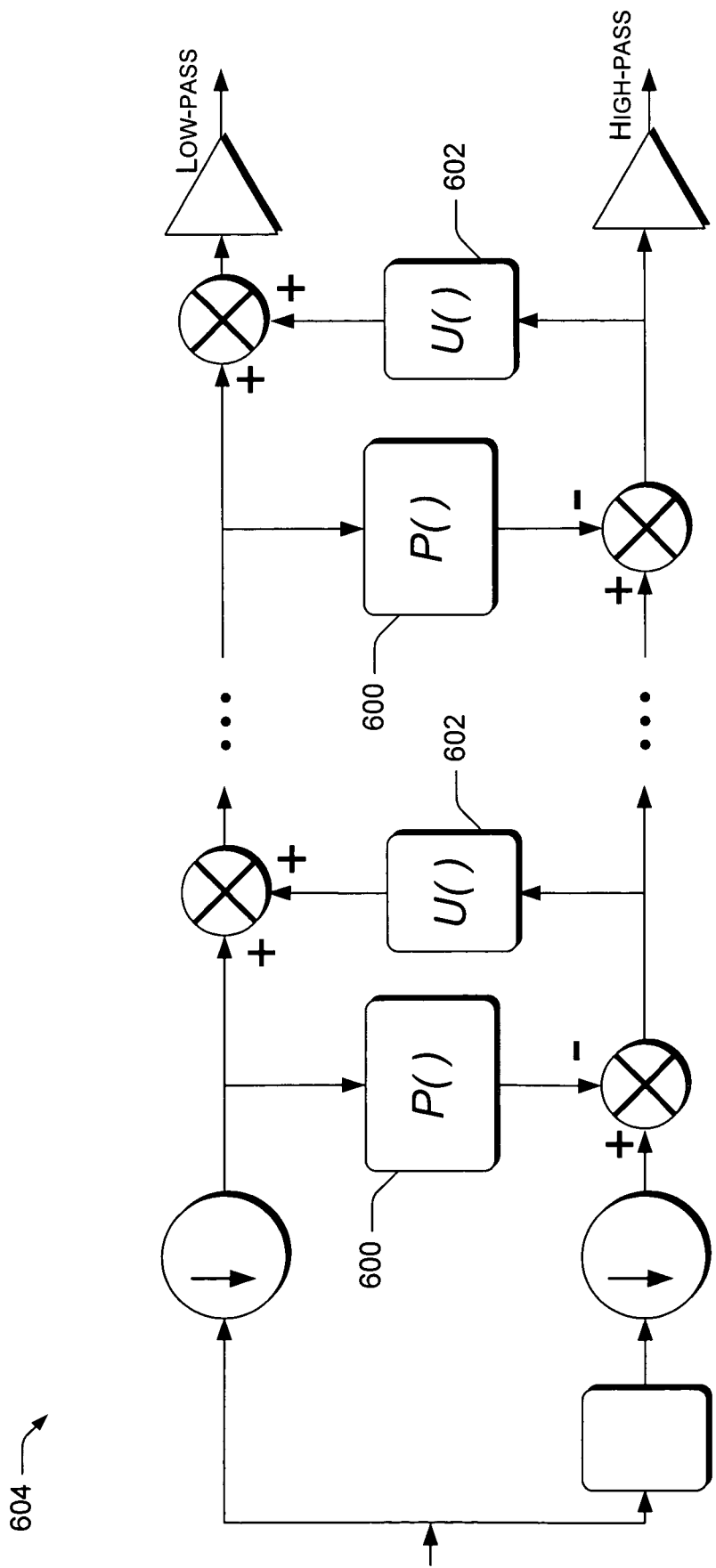
FIG. 6 is a block diagram of an exemplary lifting schema that uses leaky prediction.

In one example that provides more detail, the original video sequence is CIF video and one-level spatial scalability is demanded at the decoder 400. Then, for temporal decomposition 322 with a 5/3 filter, the motion estimation and compensation can be described as follows. The reference balance engine(s) 302 in the encoder 300 execute Equations (1) and (2):

$$H_n^{i+1} = L_{2n+1}^i - P(L_{2n}^i + L_{2n+2}^i) \quad (1)$$

$$P(L_{2n}^i, L_{2n+2}^i) = \frac{1}{2} MC((1-\alpha) \times \text{IP\_DIR}(L_{2n}^i) +$$
$$\alpha \times \text{IP\_LBS}(L_{2n}^i), MV_{2n+1 \to 2n}) +$$
$$\frac{1}{2} MC((1-\alpha) \times \text{IP\_DIR}(L_{2n+2}^i) +$$
$$\alpha \times \text{IP\_LBS}(L_{2n+2}^i), MV_{2n+1 \to 2n+2})$$

$$i = 0, \ldots, N-1$$

$$L_{2n}^i = L_n^{i+1} + U(H_{n-1}^{i+1} + H_{n+1}^{i+1}) \quad (2)$$

$$U(H_{n-1}^{i+1} + H_{n+1}^{i+1}) = -\frac{1}{4}((MC(H_{n-1}^{i+1}, MV_{2n \to 2n-1}) +$$
$$MC(H_{n+1}^{i+1}, MV_{2n \to 2n+1}))$$

$$i = 0, \ldots, N-1$$

where, as shown by way of example in FIG. 6, P( ) 600 and U( ) 602 denote the prediction and update processes of the exemplary lifting technique used in the illustrated example lifting-based filter bank 604. The term α(0<α<1) is the leaky factor. $MV_{2n \to 2n-1}$ and $MV_{2n \to 2n+1}$ are the motion vectors from an even frame to the forward and backward adjacent odd frames based on the IP_LBS 100 interpolation reference frame.

At the decoder 400, if transmission error and quantization error are not considered, the reconstructed signal $\tilde{H}_n^i$ is equal to the encoding signal $H_n^i$. For decoding at QCIF resolution, the reference balance engine 404 at the decoder 400 uses Equations (3) and (4):

$$\tilde{L}_{2n}^i = \tilde{L}_n^{i+1} + U(H_{n-1}^{i+1} + H_{n+1}^{i+1}) \quad (3)$$

$$U(H_{n-1}^{i+1} + H_{n+1}^{i+1}) = -\frac{1}{4}((MC(H_{n-1}^{i+1}, MV_{2n \to 2n-1}) +$$
$$MC(H_{n+1}^{i+1}, MV_{2n \to 2n+1}))$$

$$i = 0, \ldots, N-1$$

$$\tilde{L}_{2n+1}^i = H_n^{i+1} - P(\tilde{L}_{2n}^i + \tilde{L}_{2n+2}^i)$$

$$P(\tilde{L}_{2n}^i, \tilde{L}_{2n+2}^i) = \frac{1}{2} MC(\text{IP\_DIR}(\tilde{L}_{2n}^i), MV_{2n+1 \to 2n}) + \quad (4)$$
$$\frac{1}{2} MC(\text{IP\_DIR}(\tilde{L}_{2n+2}^i), MV_{2n+1 \to 2n+2})$$

$$i = 0, \ldots, N-1$$

For decoding at CIF resolution, the reference balance engine 404 at the decoder 400 uses Equation (3) above and Equation (5) below:

$$\tilde{L}_{2n+1}^i = H_n^{i+1} - P(\tilde{L}_{2n}^i + \tilde{L}_{2n+2}^i) \quad (5)$$

$$P(\tilde{L}_{2n}^i, \tilde{L}_{2n+2}^i) = \frac{1}{2} MC((1-\alpha) \times \text{IP\_DIR}(L_{2n}^i) +$$
$$\alpha \times \text{IP\_LBS}(L_{2n}^i), MV_{2n+1 \to 2n}) +$$
$$\frac{1}{2} MC((1-\alpha) \times \text{IP\_DIR}(L_{2n+2}^i) +$$
$$\alpha \times \text{IP\_LBS}(L_{2n+2}^i), MV_{2n+1 \to 2n+2})$$

$$i = 0, \ldots, N-1$$

If the value of α is closer to 0, then less high band information is available to perform LL band motion compensation 402 at the decoder 400. The result is that more of the drifting error will be alleviated when decoding a (lower resolution) QCIF sequence but more coding performance will be lost when decoding a (higher resolution) CIF sequence. If the value of α is closer to 1, then more high band information is available to perform motion compensation 402 at the decoder 400. This leads to increased drifting error when decoding a QCIF sequence but improved coding performance when decoding a CIF sequence. If the α value is set to the extreme value of 0, there will no spatial high band information available to perform LL motion compensation 402 resulting in the drifting error being zero. If the α is set to the other extreme value of 1, then the reference balance engine 302 uses all the high band information for LL motion compensation 402 but the drifting error when decoding a QCIF sequence will be increased.

Macroblock-Based Trade-Off to Balance References

In the exemplary encoder 300, another implementation of the exemplary reference balance engine 302' balances—at the macroblock level—the advantages of overcomplete LL band information 102 versus ordinary spatial LL band information 108. The reference balance engine 302' achieves a desirable trade-off between the two types of references by defining two INTER coding modes for the spatial LL band at the macroblock level and then directs each macroblock to be processed by one of the two coding modes.

Figure 7:
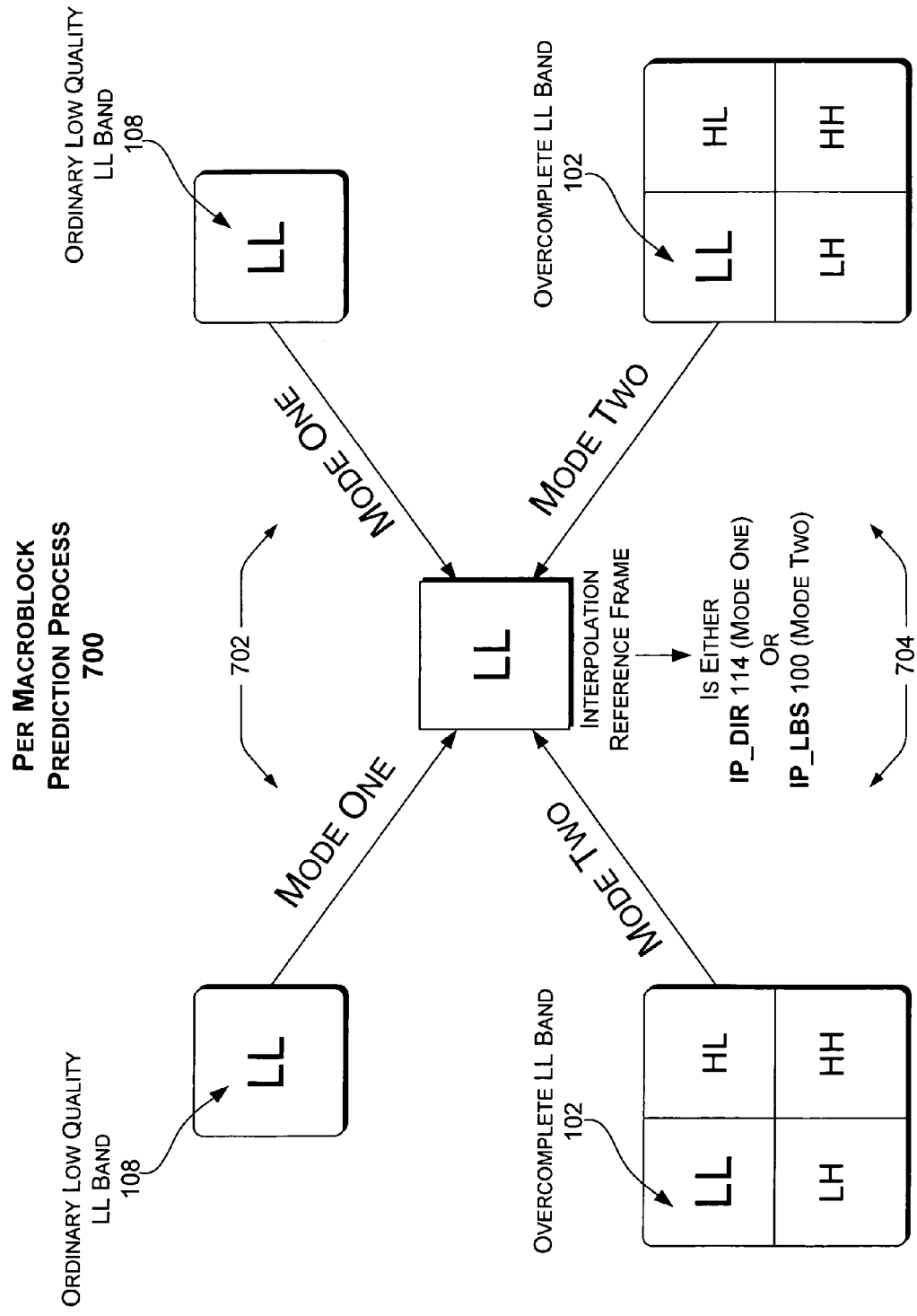
FIG. 7 is a diagram of exemplary INTER coding modes adaptively selected at the macroblock level to reduce drifting error and maintain coding performance.

FIG. 7 shows the exemplary "per macroblock" prediction process 700 just introduced. The two INTER coding modes for the spatial LL band are shown as "mode one" 702 and "mode two" 704. In mode one 702, prediction is accomplished using the low quality reference, i.e., prediction uses IP_DIR 114, which is formed by interpolating directly with the low quality spatial LL band information 108.

In mode two 704, prediction is accomplished using the high quality reference, i.e., prediction uses IP_LBS 100, which is formed by interpolating with the overcomplete LL band information 102.

Figure 8:
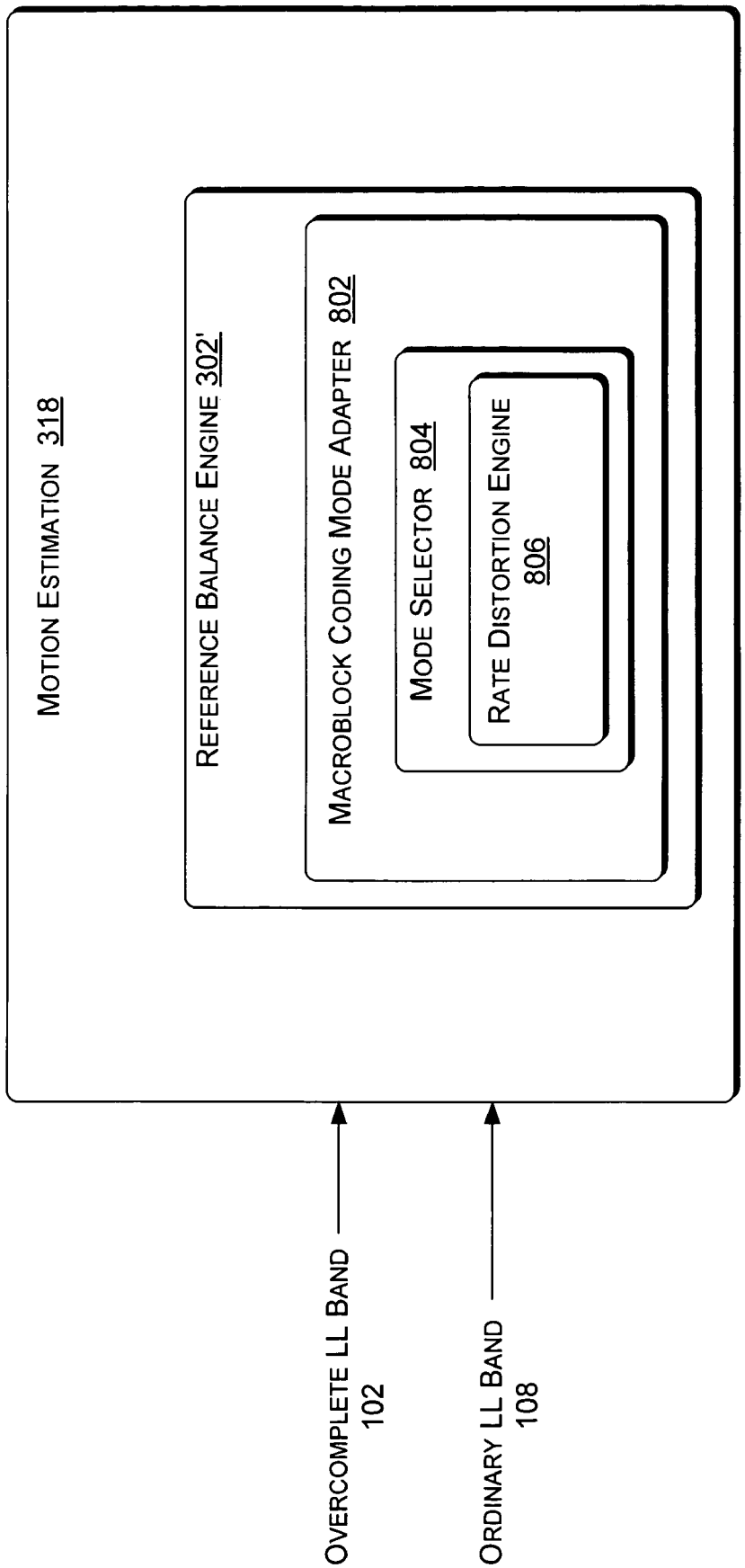
FIG. 8 is a block diagram of an exemplary reference balance engine that uses the exemplary macroblock-level coding modes of FIG. 7.

FIG. 8 shows the exemplary reference balance engine 302', mentioned above, that performs the macroblock-based trade-off for reference balancing. The reference balance engine 302' includes a macroblock coding mode adapter 802, which in turn includes a mode selector 804 with a rate distortion engine 806.

The mode selector 804 adaptively selects, for each macroblock of LL band stream content, which coding mode to use: mode one 702 or mode two 704. The decision is based on rate distortion information from the rate distortion engine 806. Both of the different quality references, the overcomplete lowpass (LL) band 102 and the ordinary spatial lowpass (LL) band 108 enter the motion estimation module 318. In one implementation, the motion estimation module 318 separately estimates one set of motion information for each of these references. Only one of these sets of motion information is selected for each macroblock, in order to save bits.

In one implementation of the rate distortion engine 806, the criterion for selecting between the sets of motion information is defined as in Equation (6):

$$RD\_Cost_{mod\ e} = \lambda_{motion} \cdot (R_{mv} + R_{mod\ e}) + SAD_L(mod\ e, MV) + \lambda_1 SAD_H(mod\ e, MV) \quad (6)$$

where $R_{MV}$ denotes the bits for coding the predicted motion vector and $R_{mode}$ denotes the bits for the partition mode of one macroblock. The term emotion $\lambda_{motion}$ is the Lagrange multiplier for searching motion vectors. $SAD_L$(mode, MV) is the sum absolute difference between the original macroblock and its low quality prediction reference. $SAD_H$(mode, MV) is the sum absolute difference between the original macroblock and its high quality prediction reference. $\lambda_1$ is a weighting factor. In one implementation, the value of $\lambda_1$ is greater than 1.0 in order to bias the selection toward the high quality reference.

Exemplary Methods

Figure 9:
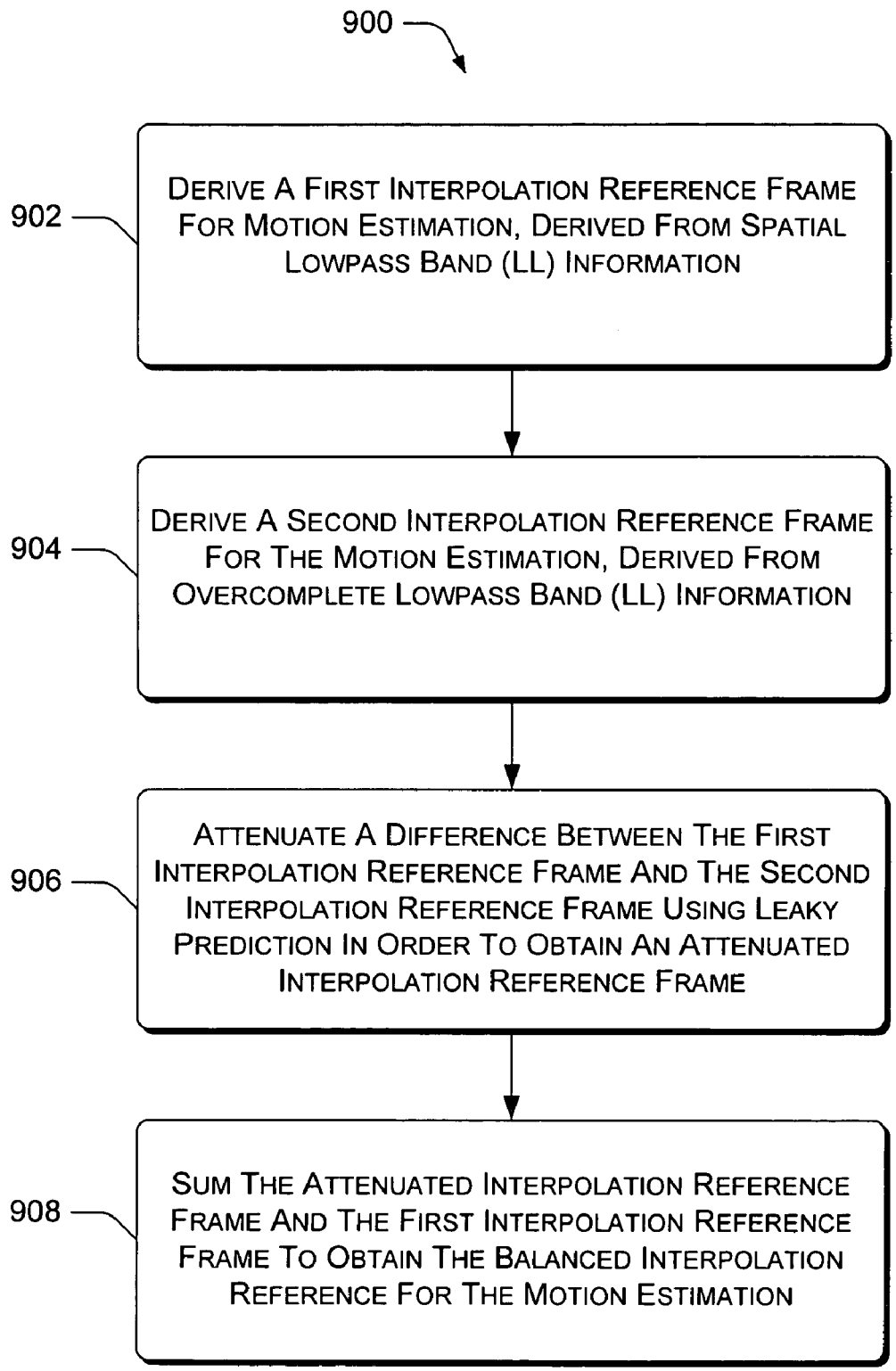
FIG. 9 is a flow diagram of an exemplary method of in-band wavelet video encoding with spatial scalability.

FIG. 9 shows an exemplary method 900 of in-band wavelet video encoding with spatial scalability. In the flow diagram, the operations are summarized in individual blocks. Parts of the exemplary method 900 may be performed by hardware, software, or combinations of both, for example, by components of the exemplary encoder 300.

At block 902, a first interpolation reference frame for motion estimation is derived from spatial lowpass band (LL) information. For example, in the motion estimation module of an exemplary encoder, direct quarter-pixel interpolation is applied to the ordinary spatial LL band to generate the IP_DIR interpolation reference frame. This may be carried out by an exemplary reference balance engine 302.

At block 904, a second interpolation reference frame for the motion estimation is derived from overcomplete lowpass band (LL) information. For example, in the same motion estimation module of the same exemplary encoder as at block 902, half-pixel interpolation of each band in the corresponding overcomplete sub-band of original video generates an IP_LBS interpolation reference frame corresponding to the IP_DIR interpolation reference frame derived at block 902.

At block 906, a difference between the first interpolation reference frame and the second interpolation reference frame is attenuated via leaky prediction in order to obtain an attenuated interpolation reference frame, for example, by the exemplary reference balance engine 302. Attenuating the prediction improves upon simply using the IP_LBS interpolation reference frame as in conventional in-band wavelet encoding schemata. Lifting with leaky prediction creates an attenuated interpolation reference frame that constitutes one element in creating an exemplary balanced interpolation reference frame.

At block 908, the attenuated interpolation reference frame is summed with the first interpolation reference frame (e.g., IP_DIR) to obtain an exemplary balanced interpolation reference frame for the motion estimation. Such an exemplary balanced interpolation reference frame gives a good trade-off between the advantages of IP_DIR and the advantages of IP_LBS. At high resolutions at the decoder, the balanced interpolation reference frame yields good coding performance. At low resolutions at the decoder, the balanced interpolation reference frame yields decreased drifting error. In other words, the method 900 of producing balanced interpolation reference frames gives a good trade-off between minimizing drifting error at lower spatial resolutions and maximizing coding efficiency at higher spatial resolutions.

If the original video sequence is CIF video and one-level spatial scalability is used at the decoder, then for temporal decomposition with a 5/3 filter, the method 900 can use Equations (1) and (2) above.

Figure 10:
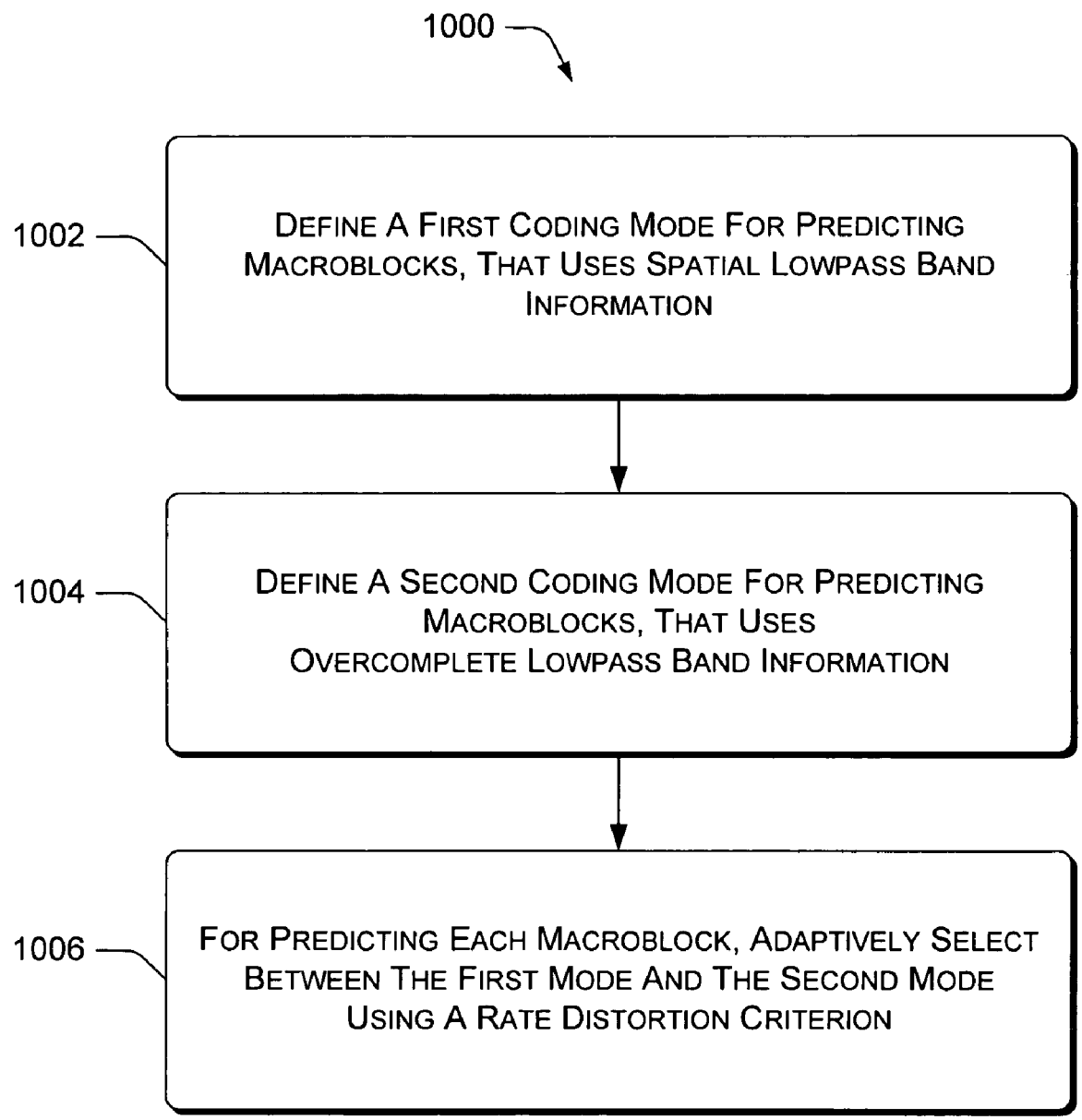
FIG. 10 is a flow diagram of another exemplary method of in-band wavelet video encoding with spatial scalability.

FIG. 10 shows another exemplary method 1000 of in-band wavelet video encoding with spatial scalability. In the flow diagram, the operations are summarized in individual blocks. Parts of the exemplary method 1000 may be performed by hardware, software, or combinations of both, for example, by components of the exemplary encoder 300.

At block 1002, a first coding mode for predicting macroblocks is defined. The first coding mode predicts macroblocks based on the ordinary spatial lowpass (LL) band information. That is, the first coding mode predicts a macroblock via an IP_DIR interpolation reference.

At block 1004, a first coding mode for predicting macroblocks is defined. The second coding mode predicts macroblocks based on the overcomplete lowpass (LL) band information. Thus, the second coding mode predicts a macroblock via an IP_LBS interpolation reference.

At block 1006, either the first coding mode or the second coding mode is adaptively selected for each macroblock using a rate distortion criterion. Both of the different quality references, the overcomplete LL band and the ordinary LL band are used by this exemplary method 1000, e.g., as performed by an exemplary motion estimation module. In one implementation, the exemplary method 1000 separately estimates one set of motion information for each of these references. Then, only one of these sets of motion information is selected for each macroblock. In one implementation, the exemplary method 1000 may apply the rate distortion criterion set forth in Equation (6) above for deciding which coding mode to apply to each macroblock.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary improvements of in-band wavelet video coding with spatial scalability. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
creating a balanced interpolation reference for motion estimation during in-band wavelet video coding, the creating comprising:
using leaky prediction based on spatial lowpass band information and overcomplete lowpass band information;
deriving a first interpolation reference frame for the motion estimation, wherein the first interpolation reference frame is derived from spatial lowpass band (LL) information;
deriving a second interpolation reference frame for the motion estimation, wherein the second interpolation reference frame is derived from overcomplete lowpass band (LL) information that includes some spatial highpass band information; and
attenuating a difference between the first interpolation reference frame and the second interpolation reference frame using lifting with a leaky prediction factor in order to obtain an attenuated interpolated reference frame; and summing the attenuated interpolation reference frame and the first interpolation reference frame to obtain the balanced interpolation reference for the motion estimation; and
performing the motion estimation using the balanced interpolation reference.

2. The method as recited in claim 1, wherein the balanced interpolation reference frame reduces a drifting error of motion prediction at lower spatial resolutions and maintains a coding efficiency of the motion prediction at higher spatial resolutions.

3. The method as recited in claim 1, wherein the first interpolation reference frame is an IP_DIR (direct) interpolation reference frame and the second interpolation reference frame is an IP_LBS (low band shifted) interpolation reference frame.

4. The method as recited in claim 3, wherein the IP_DIR interpolation reference frame is obtained by direct quarter-pixel interpolation applied to the spatial lowpass band (LL) information and the IP_LBS interpolation reference frame is obtained by half-pixel interpolation of the overcomplete lowpass band (LL) information.

5. The method as recited in claim 3, wherein the in-band wavelet video coding is performed on a common intermediate format (CIF) video sequence, one-level spatial scalability is to be used in decoding, a 5/3 filter is used for temporal decomposition, and $H_n^{i+1}$ (the balanced interpolation reference for the motion estimation) is determined by $$H_n^{i+1} = L_{2n+1}^i - P(L_{2n}^i + L_{2n+2}^i)$$

$$P(L_{2n}^i, L_{2n+2}^i) = \frac{1}{2}MC((1-\alpha) \times \text{IP\_DIR}(L_{2n}^i) + \alpha \times \text{IP\_LBS}(L_{2n}^i), MV_{2n+1->2n}) + \frac{1}{2}MC((1-\alpha) \times \text{IP\_DIR}(L_{2n+2}^i) + \alpha \times \text{IP\_LBS}(L_{2n+2}^i), MV_{2n+1->2n+2})$$

$$i = 0, \ldots, N-1$$

and $$L_{2n}^i = L_n^{i+1} + U(H_{n-1}^{i+1} + H_{n+1}^{i+1})$$

$$U(H_{n-1}^{i+1} + H_{n+1}^{i+1}) = -\frac{1}{4}((MC(H_{n-1}^{i+1}, MV_{2n->2n-1}) + MC(H_{n+1}^{i+1}, MV_{2n->2n+1}))$$

$$i = 0, \ldots, N-1$$

wherein P( ) and U( ) respectively denote prediction and update processes of the lifting with the leaky prediction factor, $\alpha(0<\alpha<1)$ is the leaky factor, and $MV_{2n \to 2n-1}$ and $MV_{2n \to 2n+1}$ are the motion vectors from an even frame of the video sequence to the forward and backward adjacent odd frames based on the IP_LBS interpolation reference frame and MC( ) is a mode coding function, n is an integer frame index, i is an integer band level index, N is an arbitrary integer number of band levels, H is a high band of a specified band level and frame and L is a low band of a specified band level and frame.

6. The method as recited in claim 5, wherein:
if the value of $\alpha$ is closer to 0, then less highband information is available to perform LL motion compensation at the decoding and drifting error will be alleviated when decoding at a lower resolution but coding performance will decrease when decoding at higher resolutions; and if the value of α is closer to 1, then more highband information is available to perform LL motion compensation at the decoding and drifting error will be increased when decoding at a lower resolution but coding performance will increase when decoding at higher resolutions.

7. The method as recited in claim 5, wherein:

if the value of α is set to a limit value of 0, there will not spatial high band information available to perform LL motion compensation at the decoding and the drifting error will be zero being 0; and if the value of α is set to a limit value of 1, then all available highband information is used for LL motion compensation at the decoding but the drifting error at lower resolutions will be at a maximum.

8. The method as recited in claim 3, wherein the in-band wavelet video coding is performed on a common intermediate format (CIF) video sequence, one-level spatial scalability is to be used in decoding, a 5/3 filter is used for temporal decomposition, and the motion compensation for decoding at CIF resolution is determined by:

$$\tilde{L}_{2n}^i = \tilde{L}_n^{i+1} + U(H_{n-1}^{i+1} + H_{n+1}^{i+1})$$

$$U(H_{n-1}^{i+1} + H_{n+1}^{i+1}) = -\frac{1}{4}((MC(H_{n-1}^{i+1}, MV_{2n->2n-1}) + MC(H_{n+1}^{i+1}, MV_{2n->2n+1}))$$

$$i = 0, \ldots, N-1$$

and $$\tilde{L}_{2n+1}^i = H_n^{i+1} - P(\tilde{L}_{2n}^i + \tilde{L}_{2n+2}^i)$$

$$P(\tilde{L}_{2n}^i, \tilde{L}_{2n+2}^i) = \frac{1}{2}MC((1-\alpha) \times IP\_DIR(L_{2n}^i) +$$
$$\alpha \times IP\_LBS(L_{2n}^i), MV_{2n+1->2n}) +$$
$$\frac{1}{2}MC((1-\alpha) \times IP\_DIR(L_{2n+2}^i) +$$
$$\alpha \times IP\_LBS(L_{2n+2}^i), MV_{2n+1->2n+2})$$

$$i = 0, \ldots, N-1$$

wherein P( ) and U( ) respectively denote prediction and update processes of the lifting with the leaky prediction factor, α(0<α<1) is the leaky factor, and $MV_{2n \to 2n-1}$ and $MV_{2n \to 2n+1}$ are the motion vectors from an even frame of the video sequence to the forward and backward adjacent odd frames based on the IP_LBS interpolation reference frame and MC( ) is a motion compensation function, n is an integer frame index, i is an integer band level index, N is an arbitrary integer number of band levels, H is a high band of a specified band level and frame and $\tilde{L}$ is a low band estimate of a specified band level and frame.

9. The method as recited in claim 3, wherein the in-band wavelet video coding is performed on a common intermediate format (CIF) video sequence, one-level spatial scalability is to be used in decoding, a 5/3 filter is used for temporal decomposition, and the motion compensation for decoding at quarter CIF (QCIF) resolution is determined by:

$$\tilde{L}_{2n}^i = \tilde{L}_n^{i+1} + U(H_{n-1}^{i+1} + H_{n+1}^{i+1})$$

$$U(H_{n-1}^{i+1} + H_{n+1}^{i+1}) = -\frac{1}{4}((MC(H_{n-1}^{i+1}, MV_{2n->2n-1}) + MC(H_{n+1}^{i+1}, MV_{2n->2n+1}))$$

$$i = o, \ldots, N-1$$

and $$\tilde{L}_{2n+1}^i = H_n^{i+1} - P(\tilde{L}_{2n}^i + \tilde{L}_{2n+2}^i)$$

$$P(\tilde{L}_{2n}^i, \tilde{L}_{2n+2}^i) = \frac{1}{2}MC(IP\_DIR(\tilde{L}_{2n}^i), MV_{2n+1->2n}) +$$
$$\frac{1}{2}MC(IP\_DIR(\tilde{L}_{2n+2}^i), MV_{2n+1->2n+2})$$

$$i = 0, \ldots, N-1$$

wherein P( ) and U( ) respectively denote prediction and update processes of the lifting with the leaky prediction factor, and $MV_{2n \to 2n-1}$ and $MV_{2n \to 2n+1}$ are the motion vectors from an even frame of the video sequence to the forward and backward adjacent odd frames based on the IP_DIR interpolation reference frame and MC( ) is a motion compensation function, n is an integer frame index, i is an integer band level index, N is an arbitrary integer number of band levels, H is a high band of a specified band level and frame and $\tilde{L}$ is a low band estimate of a specified band level and frame.

10. An encoder to perform the method as recited in claim 1.

11. A decoder to decode a scalable bitstream produced at least in part by the motion estimation of the method as recited in claim 1.

12. The method as recited in claim 1, wherein the first interpolation reference frame is attenuated using the leaky prediction factor before the summing to obtain the balanced interpolation reference for the motion estimation.

13. A method of improving a ratio of prediction performance to drifting error for in-band wavelet video coding, the method comprising:

defining two coding modes for predicting macroblocks, wherein the first mode predicts using spatial lowpass (LL) band information and the second mode predicts using overcomplete lowpass (LL) band information, wherein:

the lowpass (LL) band information is used to estimate a first set of motion information;

the overcomplete lowpass (LL) band information is used to estimate a second set of motion information; and either the first set or the second set is selected for each macroblock based on the rate distortion criterion, wherein the rate distortion criterion for selecting either the first set or the second set is determined by:

$$RD\_Cost_{mod\,e} = \lambda_{motion} \cdot (R_{mv} + R_{mod\,e}) + SAD_L(\text{mod } e, MV) + SAD_L(\text{mod } e, MV) + \lambda_1 \cdot SAD_H(\text{mod } e, MV)$$

wherein $R_{MV}$ denotes bits for coding a motion vector, $R_{mode}$ denotes bits for the coding mode of one macroblock, $\lambda_{motion}$ is the Lagrange multiplier for searching motion vectors, $SAD_L(\text{mod } e, MV)$ is the sum absolute difference between an original macroblock and its lowpass (LL) band information, $SAD_H(\text{mod } e, MV)$ is the sum absolute difference between the original macroblock and its overcomplete lowpass (LL) band information, and $\lambda_1$ is a weighting factor, wherein the value of $\lambda_1$ is greater than 1.0 in order to bias the selection of the first set or the second set toward the second set; and adaptively selecting between the first mode and the second mode for each macroblock using a rate distortion criterion.

14. The method as recited in claim 13, wherein the first coding mode uses IP_DIR references formed by interpolating directly with the spatial lowpass (LL) band information and the second mode uses IP_DIR references formed by interpolating with the overcomplete lowpass (LL) band information.

15. An encoder to perform the method as recited in claim 13.

16. A decoder to decode a scalable bitstream produced at least in part by the method as recited in claim 13.

17. A computer-readable storage medium having instructions stored thereon that, when executed by a processor, perform operations comprising:
   calculating a reference video frame for performing motion compensation associated with in-band motion compensated temporal filtering (MCTF), wherein the reference video frame reduces drifting error at lower spatial resolutions and maintains coding efficiency at higher spatial resolutions, the calculating including:
      creating an attenuated interpolation frame, the creating including:
         selecting a leaky factor; and
         attenuating a difference between an IP_LBS (low band shifted) reference frame and an IP_DIR (direct) reference frame of a lowpass/lowpass (LL) sub-band by the leaky factor;
      attenuating the IP_DIR reference frame using the leaky factor to create an attenuated IP_DIR (direct) reference frame;
   means for summing together the attenuated interpolation frame and the attenuated IP_DIR reference frame to form the reference video frame; and
   means for performing motion estimation using the reference video frame.

* * * * *

UNITED STATES PATENT AND TRADEMARK OFFICE
CERTIFICATE OF CORRECTION

PATENT NO. : 7,801,220 B2  
APPLICATION NO. : 11/203817  
DATED : September 21, 2010  
INVENTOR(S) : Dongdong Zhang et al.

It is certified that error appears in the above-identified patent and that said Letters Patent is hereby corrected as shown below:

In Column 10, line 29, in claim 5, change "$H_n^{l+1}$" to "$H_n^{i+1}$".

In Column 11, line 12, in claim 7, change "not" to "be no".

In Column 12, delete the equation at lines 53-55, in claim 7, and insert:

$$RD\_Cost_{\text{mod }e} = \lambda_{motion} \cdot (R_{mv} + R_{\text{mod }e}) + SAD_L(\text{mod }e, MV) + \lambda_1 \cdot SAD_H(\text{mod }e, MV)$$

In Column 14, line 13, in claim 17, before "summing" delete "means for".

In Column 14, line 16, in claim 17, before "performing" delete "means for".

Signed and Sealed this  
Fourth Day of September, 2012

David J. Kappos  
*Director of the United States Patent and Trademark Office*